Sept. 8, 1959   R. H. SHEPPARD   2,903,014
CHECK VALVE FOR DIESEL ENGINE FUEL PUMP Filed Dec. 4, 1953

INVENTOR
RICHARD H. SHEPPARD
BY Henry H. Snelling
ATTORNEY

United States Patent Office

2,903,014
CHECK VALVE FOR DIESEL ENGINE FUEL PUMP

Richard H. Sheppard, Hanover, Pa.

Application December 4, 1953, Serial No. 396,112

1 Claim. (Cl. 137—539)

This invention relates to fuel injection systems of the type in which there are two spaced one-way valves in the fuel pump cylinder located between the fuel pump plunger and the line leading to the injector. Its principal object is to greatly increase the life of these valves and their seats while completely eliminating mushy injection and backward leakage.

A further object of the invention is to provide a form of valve seat having a sharp edge making a circle the axis of which is concentric with the axis of the bore so that a precision ground ball of a thermoplastic made by interaction of a dicarboxylic acid with a diamine, readily obtainable as nylon, or other suitable resilient plastic not affected by fuel oil, may simply be dropped into place on the sharp seat and without any fitting whatsoever will not only close the passage completely, forming its own seating surface, and while yielding to form an annular groove of slight depth, this groove disappears as the ball leaves the seat when the plunger lifts the ball on the pumping stroke.

A further object is to provide a valve in which the moving element is a spring pressed plastic ball of light weight which will open only a slight amount, due to its low inertia, and will therefore snap shut so fast as to avoid any possible leakage. The nylon ball in use moves from one-fourth to one-tenth of the distance a steel ball of the same size travels and as a consequence, while the steel ball pounds out and therefore destroys the seating surface, the nylon ball tends to work harder and polishes and smooths the fine sharp edge of its seat. Apparently the nylon ball when pressed by a helical or a spiral spring never completely leaves the seat but rocks about a single point on the circular edge, the point moving slowly around the full 360°.

Figure 1:
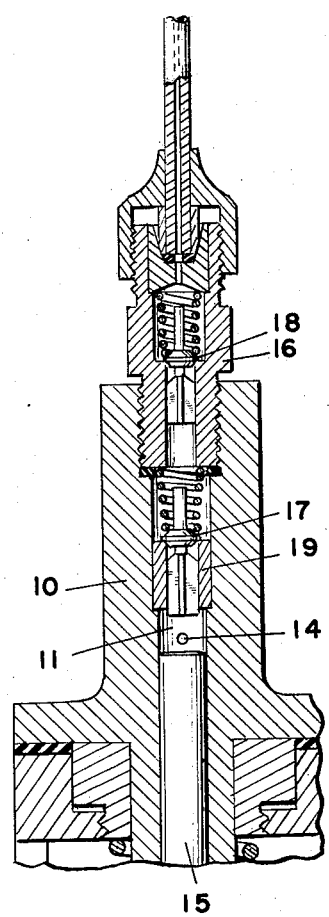
Figure 1 is a central section thru the upper portion of a fuel pump.

The invention can best be understood by first considering the prior art as illustrated in Fig. 1. The fuel pump cylinder 10 has a central bore 11 in which the pump piston or plunger 15 slides cutting off the port 14 thru which the fuel oil is admitted to the bore 11 and then opening the two spring pressed valves 16 and 17 on valve seat bushings 18 and 19 respectively. These are precision heat-treated steel products which are quite expensive to manufacture and which must be fitted by hand, a long tedious process requiring considerable skill as the parts must be ground with diamond dust and lapped with the finest of abrasives, so the labor cost of assembly equals the initial cost of the parts. Metal balls are not satisfactory because if the balls were sufficiently soft to conform to the seats permanent grooves would be formed to an extent to make the balls useless when relocated, and further even the lightest of metal balls pound the seat surfaces at the high speed and pressures common in this kind of work, from 500 to 1200 reciprocations per minute at pressures usually about 2500 p.s.i. but sometimes exceeding three times that figure, and their high inertia causes excessive travel in both directions, the return movement consequently permitting reverse flow or backward leakage.

Figure 2:
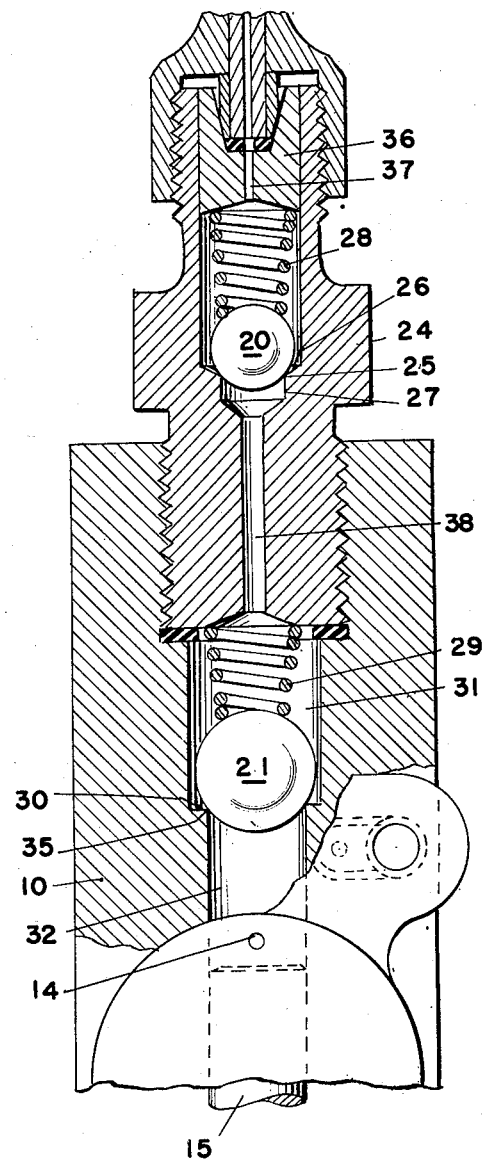
Figure 2 is a similar section on a larger scale illustrating the valve of the present invention.

In Figure 2 the accurately machined upper and lower valves 16 and 17 are replaced by readily obtainable plastic balls of 5/16" and 7/16" numbered 20 and 21 respectively, and the bushing 19 is omitted entirely. The circular, sharp-edged seat 25 in cage 24 is vastly easier to make than the conical seat 18 for precision valve 16. The two seats of the present invention are substantially perfect circles as the axes of the conical surface 26 and of the cylindrical surface 27, being bored with the same setting, coincide with a tiny tolerance to keep the difference between the major diameter and the minor diameter of the seat to less than the difference between the radius of the ball and the distance from the center of the ball to the margin of the seat when the ball closes the seat. The axis of bore 32 in cylinder 10 is exactly at right angles to the plane of surface 30 at the bottom of bore 31 so the margin 35 is never egg-shaped.

The surface of seat 30 is in a plane at right angles to the axis of the bore 32 receiving the plunger 15 and of the larger bore 31. The inside margin of the shoulder between the bores is a circle having an eccentricity of less than .001". The sharp edge 35 of the seat 30 has a radius of less in radial section than 1% of the diameter of the intermediate bore 31. The material of the ball is such that when pressed against its seat under a pressure in excess of 2000 p.s.i. it will be indented to less than .01" and will return to its original spherical shape upon leaving its seat.

With a wide seat the pressure would be insufficient to force the plastic ball to form a seal as we are dealing with drops of fuel and cannot afford the loss of even a small fraction of a drop but with the sharp edge 25 or 35 and a pressure as low as two thousand pounds per square inch the balls seat firmly forming an annular indentation in each ball which mark disappears during the pressure stroke of the plunger. The balls are urged to their sharp seats by light helical or spiral springs, preferably the latter, numbered 28 and 29.

The central bore 36 of the insert 37 at the top of the cage 24 is about one-fourth of the diameter of the lower bore 38 of the cage, and the bore 32 below ball 21 is about three times as large as the bore 38 between the balls, these dimensions being illustrative only and not limiting.

What I claim is:

The combination in a fuel injector valve structure for a diesel engine working at pressures above 2,000 p.s.i., of a fuel injector valve body having a cylindrical bore, a larger bore, and between them a shoulder forming a circular seat with a sharp edge lying in a plane at right angles to the axis of the first mentioned bore; said body having a third coaxial bore in which is located a one-way spring pressed valve to yield when the pressure on the spring side is less than the pressure on the opposite side, said circular seat having an eccentricity of less than .001" and said sharp edge of the seat having a radius in radial section of less than 1% of the diameter of the larger bore; and a precision ground, light weight, low inertia solid plastic ball spring pressed against said sharp edge and indented thereby upon closure of the ball on its seat, the material of the ball being such that the solid plastic ball will move from its seat a distance less than one-fourth of that which a solid steel ball of the same size would travel under the same pressure, the indentation is removed when the ball leaves its seat, and the depth of the indentation under a pressure of 2,000 p.s.i is less than .01", whereby mushy injection of fuel is avoided as the time the ball is off its seat is low because of the short distance traveled due to the low inertia of the ball and injury to the seat upon return of the ball to the sharp edge is minimized.

References Cited in the file of this patent

UNITED STATES PATENTS

| | | | |
|---|---|---|---|
| 1,102,066 | Mathias | June 30, | 1924 |
| 1,896,706 | Grimes | Feb. 7, | 1933 |
| 2,051,100 | Nelson | Aug. 18, | 1936 |
| 2,332,787 | Fleming | Oct. 26, | 1943 |
| 2,386,765 | Adams | Oct. 16, | 1945 |
| 2,641,278 | Eplett | June 9, | 1953 |
| 2,762,602 | St. Clair | Sept. 11, | 1956 |

FOREIGN PATENTS

| 459,662 | Great Britain | of 1937 |
|---|---|---|